US008044773B2

(12) United States Patent
Posamentier

(10) Patent No.: US 8,044,773 B2
(45) Date of Patent: Oct. 25, 2011

(54) PARALLEL RFID SYSTEM USING CDMA

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 1084 days.

(21) Appl. No.: 11/388,324

(22) Filed: Mar. 23, 2006

(65) Prior Publication Data
US 2007/0222560 A1 Sep. 27, 2007

(51) Int. Cl.
H04Q 5/22 (2006.01)
(52) U.S. Cl. ..................................... 340/10.2
(58) Field of Classification Search .................. 340/10.1, 340/10.2, 825; 370/200, 412, 229–240, 320, 370/324; 704/152
See application file for complete search history.

(56) References Cited

U.S. PATENT DOCUMENTS

| 5,606,322 A * | 2/1997 | Allen et al. ..................... 341/173 |
| 5,677,927 A * | 10/1997 | Fullerton et al. .............. 375/130 |
| 5,940,006 A * | 8/1999 | MacLellan et al. .......... 340/10.1 |
| 5,943,361 A * | 8/1999 | Gilhousen et al. ............ 375/142 |
| 6,667,708 B2 * | 12/2003 | Schooler et al. .............. 341/173 |
| 6,912,211 B2 * | 6/2005 | Gerakoulis ..................... 370/329 |
| 7,023,817 B2 * | 4/2006 | Kuffner et al. ................. 370/324 |
| 7,830,948 B2 * | 11/2010 | Schaefer et al. ............... 375/140 |
| 2002/0070845 A1 * | 6/2002 | Reisinger et al. ............. 340/5.61 |
| 2002/0085520 A1 * | 7/2002 | Sydon et al. ................... 370/335 |
| 2005/0231331 A1 * | 10/2005 | Kang .......................... 340/10.51 |
| 2005/0237159 A1 * | 10/2005 | Cooper et al. ................. 340/10.5 |
| 2006/0125640 A1 * | 6/2006 | Oakes et al. ................. 340/572.7 |
| 2007/0222560 A1 * | 9/2007 | Posamentier ................. 340/10.2 |
| 2008/0036573 A1 * | 2/2008 | Tsukamoto et al. .......... 340/10.2 |
| 2010/0214065 A1 * | 8/2010 | Maltseff et al. ............... 340/10.1 |

OTHER PUBLICATIONS

U.S. Appl. No. 11/134,214, filed May 19, 2005—Posamentier—Directional Transmissions to Multiple Wireless Devices.

* cited by examiner

Primary Examiner — Brian Zimmerman
Assistant Examiner — An Nguyen
(74) Attorney, Agent, or Firm — Schwegman, Lundberg & Woessner, P.A.; Gregory J. Gorrie

(57) ABSTRACT

Various embodiments of the invention may use code division multiple access (CDMA) technology in communications from radio frequency identification (RFID) tags to RFID readers, so that multiple RFID tags may respond to the same RFID reader at the same time on the same frequency and still be reliably decoded by the RFID reader. In some embodiments, orthogonal CDMA PN sequences for the RFID tags to use in creating their responses may first be transmitted to those RFID tags, possibly using a non-CDMA technique.

2 Claims, 4 Drawing Sheets

PARALLEL RFID SYSTEM USING CDMA

BACKGROUND

The use of radio frequency identification (RFID) technology is becoming increasingly widespread, and in some cases the desire to increase performance is approaching the limits of conversion RFID technology. In particular, the requirement that each RFID tag be read individually and serially limits the number of tags that can be read in a given time period. Trying to read larger numbers of RFID tags may make current systems unreliable when the communication time is limited, for example when the RFID tags are moving past the RFID reader (e.g., as on a conveyer belt) or the RFID reader is moving past the RFID tags (e.g., as on a warehouse inventory vehicle). This problem will only get worse as increased functionality causes an ever-larger amount of information to be transmitted by each RFID tag.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
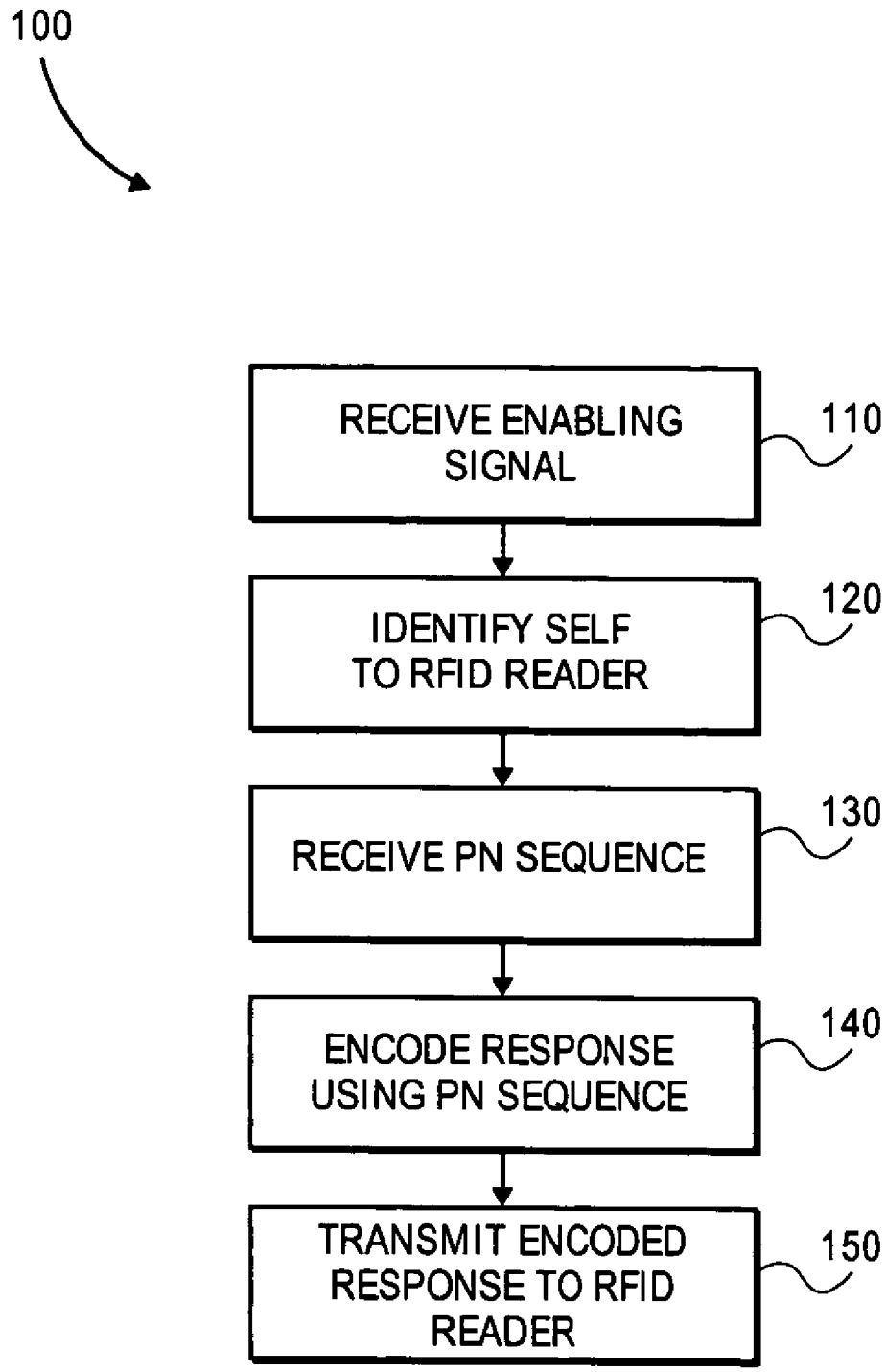
FIG. 1 shows a flow diagram of a method performed by an RFID tag, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "wireless" may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

Within the context of this document, an RFID tag may be defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and use some of that energy to power the operations of the RFID tag circuit). As is known in the field of RFID technology, "transmitting" a signal from an RFID tag may include either: 1) providing sufficient power to the antenna to generate a signal that radiates out from the antenna, or 2) reflecting a modulated version of the received signal. Within the context of this document, an RFID reader may be a device that wirelessly transmits a signal to the RFID tag to cause the RFID tag to wirelessly transmit the aforementioned response, which may be received by the RFID reader to identify the RFID tag. The RFID tag antenna may be a dipole antenna.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing information in a form readable by a machine (e.g., a computer). For example, a machine-readable medium may include a storage medium, such as but not limited to read only memory (ROM); random access memory (RAM); magnetic disk storage media; optical storage media; a flash memory device, etc.

Various embodiments of the invention may use code division multiple access (CDMA) technology in the wireless communications from RFID tags to RFID readers, so that multiple RFID tags may respond to the same RFID reader at the same time on the same frequency and still be reliably decoded by the RFID reader. In some embodiments, the RFID reader first transmits a separate pseudo-noise (PN) sequence (used for encoding/decoding CDMA communications) to each RFID tag that is permitted to respond at the same time, thus ensuring orthogonality in the signals from the various RFD tags that actually do respond at the same time. The principals of CDMA communications and the associated PN sequences is known, and is not repeated here to avoid confusing the details of various embodiments of the invention.

FIG. 1 shows a flow diagram of a method performed by an RFID tag, according to an embodiment of the invention. In flow diagram 100, at 110 the RFID tag may receive an enabling signal. In some embodiments, an enabling signal may be a signal within a particular frequency range, and of sufficient strength, to cause the RFID tag to 1) operate its circuitry, and 2) receive data encoded in the signal and/or transmit a response. In some embodiments, an enabling signal may also contain an address or other identifier indicating that this RFID tag is to respond.

At 120, the RFID tag may respond by transmitting its identification number to the RFID reader. In some embodiments, this may be part of a singulation process in which the RFID reader identifies which RFID tags are within range and may respond, so that it may then address them individually, or in specific groups. At 130, the RFID tag may receive a transmission containing a PN sequence for this particular RFID tag to use in a subsequent CDMA-encoded response to the RFID reader. In some embodiments, each tag may receive its PN sequence in an individual transmission from the RFID reader, while in other embodiments a single transmission from the RFID reader may contain multiple PN sequences, each designated for a different RFID tag, with suitable indicators to indicate which PN sequence is to be used by which tag. Although the transmission received from the RFID reader at 130 contains a PN sequence for use in a CDMA-encoded transmission, in some embodiments the transmission from the RFID reader may not use CDMA encoding techniques itself.

At 140, this particular RFID tag may encode its response to the RFID reader with its PN sequence. The encoding may use any suitable CDMA technique, whether now existing or yet to be developed. At 150, the RFID tag may transmit its now-encoded response to the RFID reader. Although 140 and 150 are shown as sequential operations, in some embodiments they may be performed partly or wholly in parallel. Any subsequent operations after 150, either in the RFID tag or the RFID reader, may depend on the particular application and specific circumstances.

Figure 2:
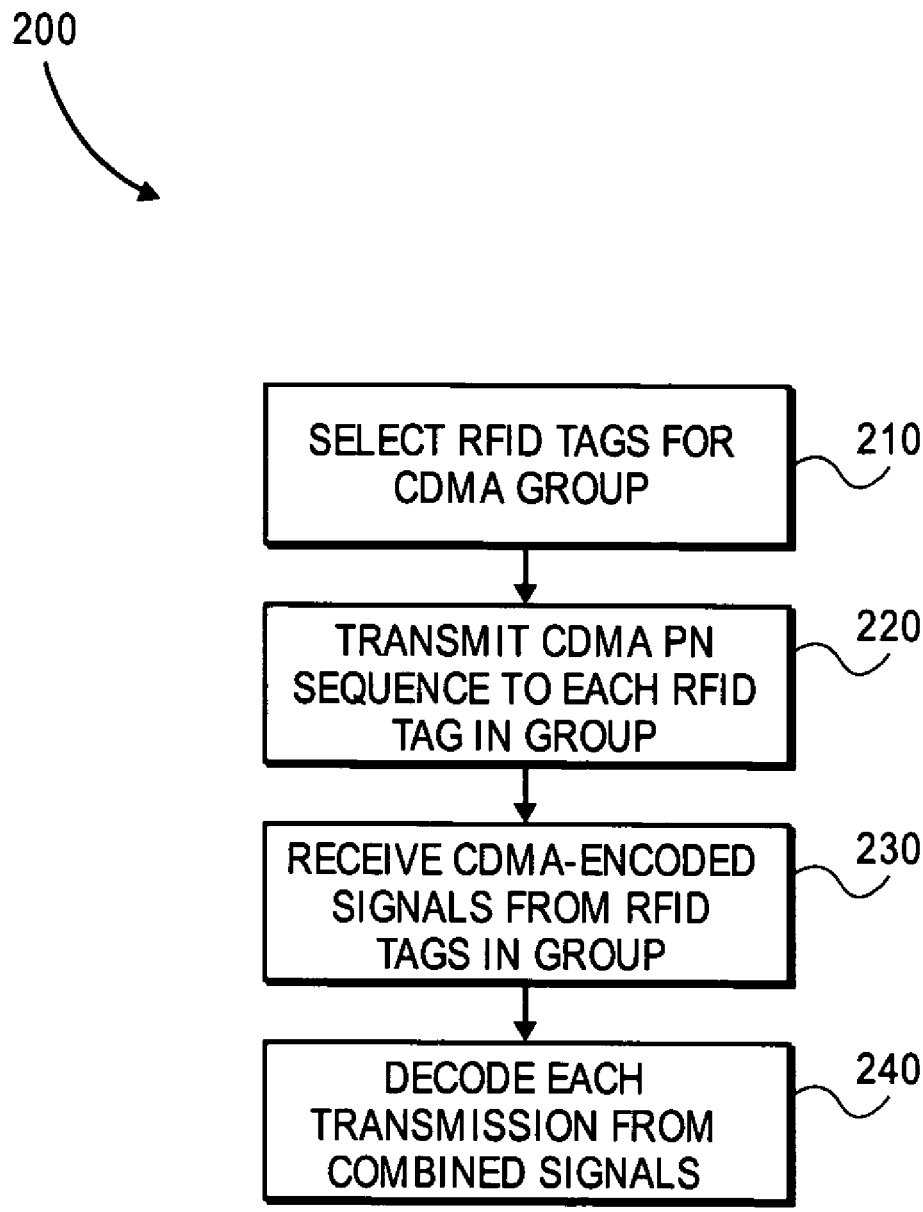
FIG. 2 shows a flow diagram of a method performed by an RFID reader, according to an embodiment of the invention.

FIG. 2 shows a flow diagram 200 of a method performed by an RFID reader, according to an embodiment of the invention. At 210, the RFID reader may select two or more RFID tags to place into a CDMA group. In some embodiments, identification of the selected RFID tags may be based on the hard-coded address in each RFID tag, but other embodiments may use other techniques. The RFID tags selected for this group will later be prompted to respond at the same time, or at least partially at the same time, to a poll from the RFID reader. Various methods of singulation and/or other techniques may be used to identify which RFID tags should go into the same group. At 220, a different CDMA PN sequence may be transmitted to each RFID tag in the group. In some embodiments, the different PN sequences may be orthogonal in nature, as that term is commonly used in CDMA technology. In some embodiments, each PN sequence may be sent in different transmissions, while in other embodiments a single transmission may contain multiple PN sequences, each appropriately associated with a different RFID tag.

At 230 the RFID reader may receive CDMA-encoded signals from the various RFID tags in the specified group. The signals from the different RFID tags may overlap in time, at least partially, so that during some portions of the transmissions, the RFID reader may be simultaneously receiving signals from at least two RFID tags. The amount and timing of such overlap may depend on various things, such as but not limited to: 1) the relative length of the response from each RFID tag, 2) the start time of each RFID transmission, 3) etc. Whether signals are received from all of the RFID tags in the identified group, or just some of them, may depend various criteria, such as but not limited to: 1) local conditions which can effect the strength, or even the presence, of a signal from a particular RFID tag, 2) orientation of the antenna of each RFID tag, 3) distance of each RFID tag from the RFID reader, 4) etc.

Using the PN sequences previously transmitted to the RFID tags, at 240 the RFID reader may decode the combined signals received through its antenna to produce the data transmitted from each RFID tag, using CDMA techniques. For proper operation, the various transmissions from the various RFID tags may need to be synchronized to a certain extent. For example, the data bits in the transmitted data may need to be synchronized, i.e., the currently-transmitted bit for one RFID tag may need to start and stop at approximately the same time as the currently-transmitted bit for all the other responding RFID tags in the group. This synchronization may be achieved by the RFID tags in various ways, such as by using a preamble at the start of the transmission from the RFID reader as a synchronizing reference.

Figure 3:
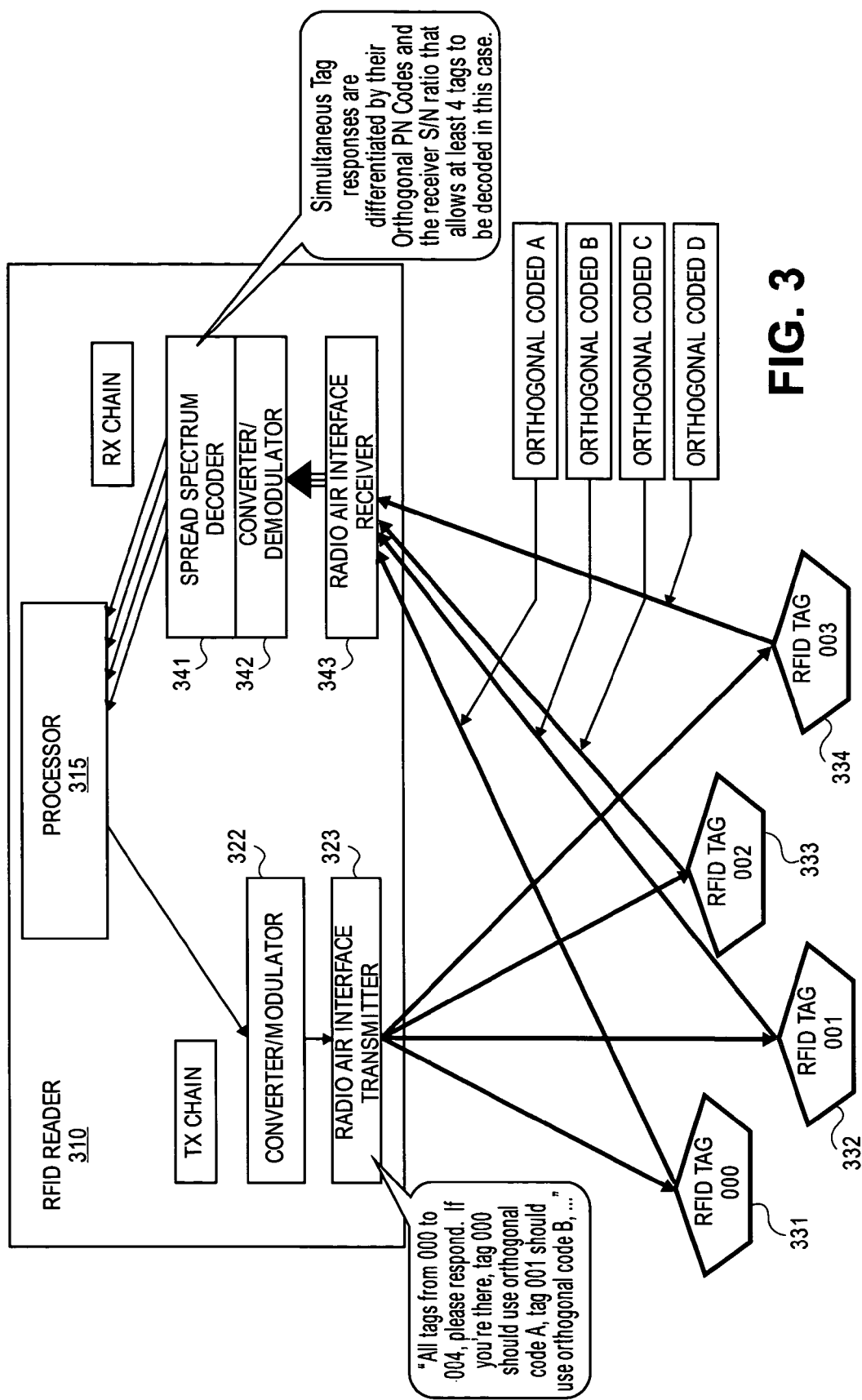
FIG. 3 shows an RFID system with CDMA capability, according to an embodiment of the invention.

FIG. 3 shows an RFID system with CDMA capability, according to an embodiment of the invention. In the illustrated embodiment, RFID reader 310 may comprise at least one processor 315 to control operations of the RFID reader. In some embodiments, processor(s) 315 may provide data to, and at least partially control, a transmit chain which may include a converter/modulator 322 to convert the data to the proper protocols and modulate the results into a signal suitable for transmitting. This signal may then be provided to a radio air interface transmitter 323 including a power amplifier and an antenna (not shown). The signal may then be transmitted from the antenna to the surrounding area, where the signal may be received by various RFID tags, such as tags 331, 332, 333, and 334. When the RFID tags each transmit a response, their responses may be received by the RFID reader through the radio air interface receiver 343, including an antenna and suitable filters (not shown) to isolate the desired signals from all the other background signals that might also be received. The isolated signals may then be passed on to a converter/demodulator 342, which may demodulate the received signals into protocol-formatted data which may then be converted into raw data for processor 315.

The data initially sent from the RFID reader 315 to the RFID tags 331-334 may contain various things, such as addresses or partial addresses to limit the number of RFID tags that will try to respond. In addition, the data may include orthogonal PN sequences, each assigned to a particular RFID tag, for the assigned tags to use when responding. In the illustrated example, the four tag addresses 000 through 003 are addressed, with orthogonal PN sequences A, B, C, and D assigned to the four RFID tags, respectively. Note: these addresses and sequence letters are merely symbolic identifiers used here for purposes of illustration. In actual practice, much larger binary numbers might be used for both. In some embodiments, the RFID reader 310 may create the PN sequences, and make sure they are orthogonal to each other. Alternately, in systems with a relatively small number of predicatable tag addresses, the orthogonal PN sequences may be pre-assigned, or even hard-coded, into the RFID tags.

Because the data was encoded in the RFID tags using CDMA techniques, when the received encoded data is decoded in the receive chain, the same PN sequences that were used to encode the data may be used to decode the data and separate it into the individual responses from the individual RFID tags. Various decoding techniques may be used (e.g., a spread spectrum decoder 341 such as a Viterbi decoder, a block correlator, or a simple de-spreader with a linear correlator). If the signal-to-noise ratio of the signal received through the RFID reader's antenna is sufficient, several individual transmissions from different RFID tags may be accurately separated and decoded using this technique. The maximum number that may be simultaneously handled in this manner may depend on various factors. For example, a limit may be designed into the RFID reader 310 or the associated CDMA implementation, but environmental factors may provide further limits, such as relative signal strengths, interference from other wireless devices, the number of available RFID tags that can be feasibly grouped together based on address formats, etc. In some embodiments, up to eight RFID tags may be simultaneously handled in this manner, but other embodiments may be able to handle fewer or more (e.g., 4, 10's, 100's, etc.).

Figure 4:
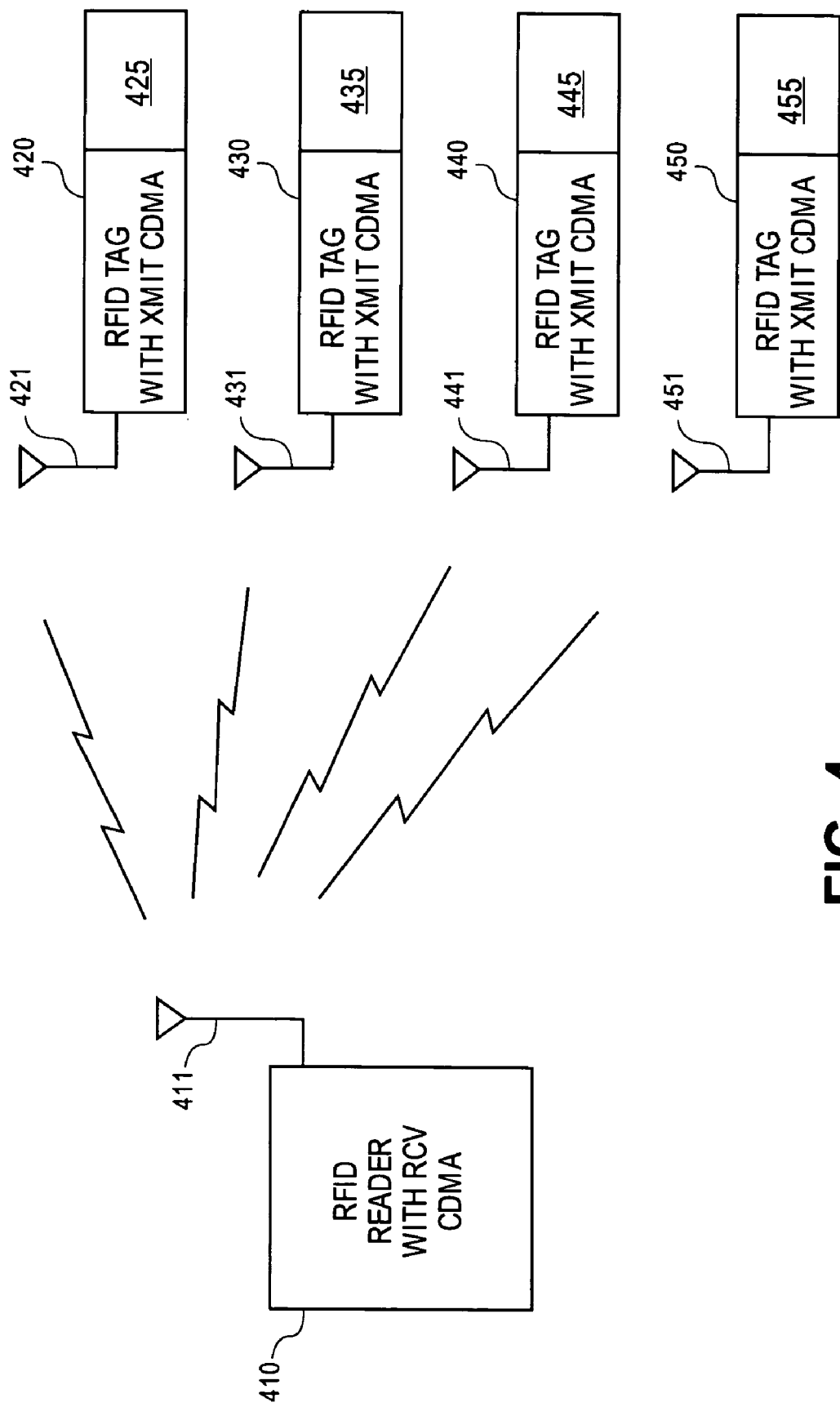
FIG. 4 shows an RFID reader and multiple RFID tags, according to an embodiment of the invention.

FIG. 4 shows an RFID reader and multiple RFID tags, according to an embodiment of the invention. In the illustrated example, RFID reader 410 may include one or more RFID antennas 411 through which it may transmit wireless signals to, and receive wireless signals from, various RFID tags. RFID reader 410 may be configured with CDMA decoding capability in its receive chain, but may or may not include CDMA encoding capability in its transmit chain. The illustrated embodiment also shows four RFID tags, each comprising an RFID tag circuit 420 (or 430 or 440 or 450) coupled to one or more RFID antennas 421 (or 431 or 441 or 451). In some embodiments, the RFID tag circuit and RFID antenna are manufactured separately and attached at a later time, but in other embodiments the RFID tag circuit and RFID antenna are manufactured together. Each RFID tag circuit may be configured with CDMA encoding capability for its transmission operations, but may or may not include CDMA decoding capability in its receive operations. One possible reason to have unidirectional CDMA operations is that most RFID operations are limited by the response bandwidth (communications from tags to reader), but are relatively unrestricted by the polling bandwidth (communications from reader to tags), so designing for CDMA operations in both directions may provide significant additional cost but little benefit. However, CDMA capability in both directions may be included in some embodiments.

Because identifying RFID tags may provide little benefit by itself, most RFID tags are intended to be attached to other objects, and identification of these other objects is the main intent of the system. FIG. 4 shows each RFID tag circuit attached to an object 425, 435, 445, or 455, respectively. These objects may be any feasible objects, such as but not limited to retail merchandise, sensor devices, electronic equipment, documents, shipping packages/crates/boxes, etc. The association between a particular RFID tag and a particular object may be made at any point, such as in the RFID reader, in a system (not shown) that communicates directly or indirectly with the RFID reader, etc.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A radio frequency identification (RFID) reader device:
    select a CDMA group of two or more RFID tags based on addresses of the RFID tags;
    transmit a non-CDMA enabling signal to the RFID tags of the selected CDMA group by including within the enabling signal an ID number of each RFID tag of the selected CDMA group and a different orthogonal PN sequence associated with each ID number;
    concurrently receive response signals from the RFID tags of the selected CDMA group, each response signal comprising a preamble for synchronization and data encoded with one of the PN sequences; and
    synchronize with and decode the concurrently received response signals to reproduce the data transmitted by each of the RFID tags of the selected CDMA group,
    wherein RFID tags receiving the enabling signal are configured to determine from the ID numbers within the enabling signal whether or not to respond,
    wherein based on the ID numbers within the enabling signal, the RFID tags within the selected CDMA group receiving the enabling signal are configured to store the PN code associated with their ID number and concurrently respond to the enabling signal by transmitting a response signal that include the preamble for synchronization and data encoded with the PN sequence associated with their ID number,
    wherein based on the ID numbers within the enabling signal, RFID tags not within the selected CDMA group receiving the enabling signal are configured to refrain from storing a PN code and refrain from responding to the enabling signal, and
    wherein the enabling signal is configured to be of sufficient strength to power circuitry of an RFID tag to:
    receive the enabling signal,
    determine from the ID numbers within the enabling signal whether or not to respond;
    to store the PN code when determined to part of the CDMA group; and
    transmit the response signal when determined to part of the CDMA group.

2. The RFID tag reader of claim 1, further including a dipole antenna to receive the response signals.

* * * * *